United States Patent [19]

Goodnow, II et al.

[11] Patent Number: 5,699,507

[45] Date of Patent: Dec. 16, 1997

[54] METHOD OF IDENTIFYING SIMILARITIES IN CODE SEGMENTS

[75] Inventors: James E. Goodnow, II, Grass Valley, Calif.; Jonathan Isaac Helfman, Gillette, N.J.; Thaddeus Julius Kowalski, Summit, N.J.; John J. Puttress, New Providence, N.J.; James R. Rowland, Short Hills, N.J.; Carl Robert Seaquist, Auburn, Ala.

[73] Assignee: Lucent Technologies Inc., Murray Hill, N.J.

[21] Appl. No.: 373,342

[22] Filed: Jan. 17, 1995

[51] Int. Cl.⁶ .................................................. G06F 11/00
[52] U.S. Cl. ............................................. 395/183.14
[58] Field of Search .................. 395/183.14, 183.13, 395/704, 568

[56] References Cited

U.S. PATENT DOCUMENTS

| | | | |
|---|---|---|---|
| 4,853,851 | 8/1989 | Horsch | 364/300 |
| 5,132,972 | 7/1992 | Hansen | 395/183.14 |
| 5,291,497 | 3/1994 | Ulrich et al. | 395/183.14 |
| 5,335,342 | 8/1994 | Pope et al. | 395/183.14 |
| 5,408,642 | 4/1995 | Mann | 395/183.14 |
| 5,423,027 | 6/1995 | Jackson | 395/183.14 |
| 5,440,723 | 8/1995 | Arnold et al. | 395/183.14 |
| 5,522,036 | 5/1996 | Shapiro | 395/183.14 |

FOREIGN PATENT DOCUMENTS

A-0 268 293   5/1988   European Pat. Off. .

OTHER PUBLICATIONS

Carver et al., "State Analysis of ConcurrentSoftware for Deriving Synchronization Constraints", IEEE, pp. 544–551, 1991.

Kunu et al., "A Scalable, Visual Interface for Debugging With Event–Based Behavorial Abstraction", IEEE, pp.472–479, Sep. 1995.

Helfman "Similarity Patterns in Language", IEEE, pp.173–175, Sep. 1994.

Anger et al, "Combining Static and Dynamic Analysis of Concurrent Programs" Software Maintenance, 1994 Conf. IEEE Pub. pp.89–98.

Canfora et al, "Extracting Abstract Data Types From C Programs: A Case Study" Software Maintenance, 1993 Conf. IEEE Pub. pp. 200–209.

R. Gopal et al. "Using Automatic Program Decomposition Techniques in Software Maintenance Tools" *Proceedings Of The Conference On Software Maintenance*, pp. 132–141 XP000120465 (1989).

M. T. Harandi et al. "Knowledge–Based Program Analysis," *IEEE Software*, vol. 7, No. 1, pp. 74–81, (1990).

Kellner, M. I., "Non–Traditional Perspective on Software Maintenance," 1989 IEEE Conference on Software Maintenance, pp. 220–221, IEEE Computer Society Press, Washington (Oct. 1989).

(List continued on next page.)

*Primary Examiner*—Robert W. Beausoliel, Jr.
*Assistant Examiner*—Joseph E. Palys
*Attorney, Agent, or Firm*—Michele L. Conover; Patricia A. Verlangieri

[57] ABSTRACT

A method of analyzing a plurality of code segments to determine the similar static and dynamic features of the code segments compares the static and dynamic features of each of the code segments. Each code segment is comprised of one or more lines of program instructions. One or more predetermined static attributes are extracted from each code segment. Each code segment is then run so that the dynamic attributes of the code segment can be determined. The dynamic attributes are extracted from each code segment and a distance function is computed which is based on the extracted static and dynamic attributes for a given pair of code segments. The distance function produces a distance measurement which indicates the relative degree of similarity between the given pair of code segments.

35 Claims, 2 Drawing Sheets

OTHER PUBLICATIONS

Glass, R. L., "Position Paper: Software Maintenance is a Solution, Not a Problem," 1989 IEEE Conference on Software Maintenance, pp. 224–225, IEEE Computer Society Press, Washington, (Oct. 1989).

McFarland, M. C. and Kowalski, T. J., "Incorporating Bottom–Up Design into Hardware Synthesis," IEEE Transactions on Computer–Aided Design 9(9), pp. 938–950 (Sep. 1990).

Johnson, S. C., "Hierarchical Clustering Schemes," Psychometrika 31(3), pp. 241–254 (Sep. 1967).

Caldiera, G., "Searching Existing Programs for Reusable Components," 1989 IEEE Conference on Software Maintenance, pp. 222–223, IEEE Computer Society Press, Washington (Oct. 1989).

Steffen, J. L., "Interactive Examination of a C Program with Cscope," USENIX Winter Conference Proceedings, pp. 170–175, USENIX Association, Dallas (Jan. 1985).

Chen, Y. F. and Ramamoorthy, C. V., The C Information Abstractor Proceedings of the Tenth International Computer Software and Applications Conference (Oct. 1986).

Harandi, M. T. and Ning, J. Q., "Knowledge–Based Program Analysis," IEEE Software, pp. 74–81 (Jan. 1990).

Rich, C. and Wills, L. M., "Recognizing a Program's Design: A Graph–Parsing Approach," IEEE Software, pp. 82–89 (Jan. 1990).

Colbrook, A. and Smythe, C., "The Retrospective Introduction of Abstraction into Software," 1989 IEEE Conference on Software Maintenance, pp. 166–174, IEEE Computer Society Press, Washington (Oct. 1989).

Hausler, P. A., Pleszkoch, M. G., Linger, R. C. and Hevner, A. R., "Using Function Abstraction to Understand Program Behavior," IEEE Software, pp. 55–63 (Jan. 1990).

Benedusi, P., Cimitile, A., and DeGarlini, U., "A Reverse Engineering Methodology to Reconstruct Hierarchical Data Flow Diagrams for Software Maintenance," 1989 IEEE Conference on Software Maintenance, pp. 180–189, IEEE Computer Society Press, Washington (Oct. 1989).

Choi, S. C. and Scacchi, W., "Extracting and Restructuring the Design of Larch Systems," IEEE Software, pp. 66–71 (Jan. 1990).

Ricketts, J. A., DelMonaco, J. C. and Weeks, M. W., "Data Reengineering for Application Systems," 1989 IEEE Conference on Software Maintenance, pp. 174–179, IEEE Computer Society Press, Washington (Oct. 1989).

Yang, W., Horwitz, S., and Reps, T., "Detecting Program Components with Equivalent Behaviors," TR–840, Computer Sciences Dept., Univ. of Wisconsin, Madison (Apr. 1989).

Kowalski, T. J., Seaquist, Goguen, H. H., Ellis, B. and Puttress, J. J., Castillo, C. M., Rowland, J. R., Rath, C. A., Wilson, J. M., and Vesonder, G. T. and Schmidt, J. L., "The AT&T C and C++ Programming Environment: An Integrated Reflective Toolkit," Proceedings of the International Workshop on UNIX–Based Software Development Environments, USENIX, Dallas, TX (Jan. 16, 1991).

M. C. McFarland, T. J. Kowalski, "Incorporating Bottom–Up Design into Hardware Synthesis", IEEE Transactions on Computer–Aided Design, vol. 9, No. 9, Sep. 1990.

METHOD OF IDENTIFYING SIMILARITIES IN CODE SEGMENTS

BACKGROUND OF THE INVENTION

The present invention is directed to methods for identifying similarities in code segments.

In the course of developing new software and modifying listing software, programmers frequently copy segments of code either from the same program or another existing program for the purpose of incorporating the code segments into their software. Sometimes the incorporated code segments are used in the exact form in which they have been copied. However, many times, the incorporated code segments are modified to accommodate the software. As the software evolves, the software usually ends up containing multiple segments of code which although not identical, either evolved from the same incorporated code segment, or are similar in either content or function. This can cause problems as revisions or updates are made to the software because the revisions or updates may not be made to each applicable code segment, thereby producing errors or inconsistencies in the software.

Methods exist for identifying exact matches in different code segments. However, oftentimes, the program may contain code segments which are not identical, but which contain similar variable names or perform similar functions and, as such, should be subject to the same type of modifications. These methods do not identify these types of inexact matches. The matches may be inexact due to the renaming of variables or the use of different characterizations for the same functions. Identifying these types of approximate matches is difficult since there is no way to identify whether symbols are different because of renaming or because the symbols represent different values.

Methods exist for identifying non-exact matches which identify static characteristics, such as variable names, which are different but which represent the same variable. One such method identifies so called "paramterized" matches in parameterized strings, that is, strings containing symbols from more than one alphabet in which the symbols from one of the alphabets are treated as variables. The method locates the non-exact matches by recognizing duplications of a parameterized pattern string in a parameterized text string by substituting integers for the symbols of the alphabet representing parameters in both the pattern string and the text string and then creating a suffix tree representing the substituted pattern string. The substituted text string is then compared to the suffix tree to identify any matches which exist.

Other methods exist which use dynamic characteristics for testing code segments. Dynamic characteristics include control flow and dater flow analysis. Control flow analysis focuses on the overall structure of the program. Data flow analysis focuses on the movement of data through the program and the modifications performed on the data. Such analysis may be used to identify code segments which are not utilized by the program or code segments where bottlenecks occur due to over-usage. In general, these types of methods focus on single events within the program and the properties of those isolated events.

SUMMARY OF THE INVENTION

In accordance with the present invention, a method of identifying similarities in code segments has been recognized which analyzes both static and dynamic characteristics of code segments to determine a distance function for each of the characteristics. These distance functions are then used to identify similarities between the code segments.

In a preferred embodiment, a plurality of code segments are analyzed to determine the similar static and dynamic features of the code segments. Each code segment is comprised of one or more lines of program instructions. One or more predetermined static attributes are extracted from each code segment. Each code segment is then run so that the dynamic attributes of the code segment can be determined. The dynamic attributes are extracted from each code segment and a distance function is computed which is based on the extracted static and dynamic attributes for a given pair of code segments. The distance function produces a distance measurement which indicates the relative degree of similarity between the given pair of code segments.

DETAILED DESCRIPTION

Figure 1:
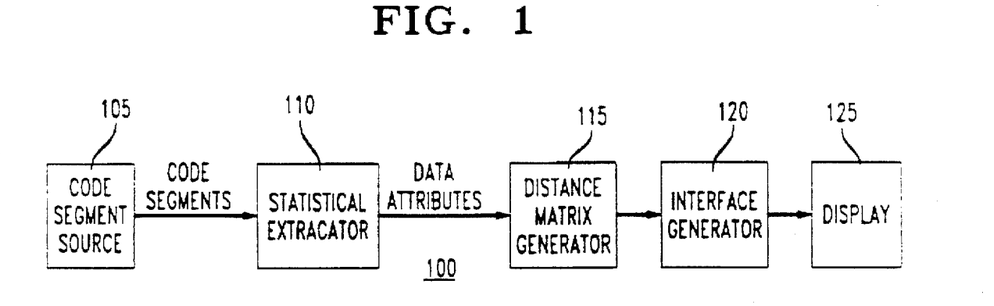
FIG. 1 illustrates a block diagram of a system for identifying similarities in code segments in accordance with the present invention.

FIG. 1 illustrates a block diagram of a typical system 100 for determining similarities in code segments in accordance with the present invention. Code segment source 105 provides segments of code, representative of one or more programs, to a statistical extractor 110. Those skilled in the art will recognize that code segment source 105 will encompass a wide variety of devices and processes capable of code storage and/or generation. For example, code segment source 105 may be a memory device in which the code segments are simply stored in the device, or more generally, code segment source 105 may be a process which generates segments of code and sends the code segments to statistical extractor 110 in real time. The statistical extractor 110 extracts predefined data attributes from each code segment. These data attributes may include, but are not limited to, variable names, operators and data types. The statistical extractor 110 also extracts dynamic attributes of the code segments such as control flow or data flow information.

A distance matrix generator 115 receives the information from the statistical generator 110 and identifies similarities between the segments of code as a function of a weighing scheme as will be described in detail hereinafter. Those skilled in the art will recognize that the weighing scheme may be determined by a number of means, e.g., interaction with a user of the system 100 or application programs which scan the code segments and select a specific weighing scheme based on criteria which defines the segments as will be described in detail hereinafter. An interface generator 120 generates an interface such as, but not limited to, a cluster interface or dot plot matrix, which is based on the generated distance matrices. Display signals comprising control signals, data signals and other signals necessary for producing the interface are transmitted to a display 125.

In accordance with the present invention, predefined metrics which include both static and dynamic characteristics are considered in identifying similarities in two or more code segments. These predefined metrics include, but are not limited to, information about variables, operators, control flow and data flow. Variable information generally includes type, linkage information, storage type and name. Operator information generally includes the operation type in which the specific operator is contained, e.g., arithmetic operator or logic operator. Control flow information generally includes a history of every file name and line number which has been visited. Data flow information generally includes history records of events which are defined by every time a variable is modified or referenced. Each time such an event occurs, the file name, function block, level and variable name is recorded.

These static and dynamic similarities are not always identically represented in each code segment. As such, analysis must be performed on the code segments to first determine if similarities are present, and second to determine the degree or measurement of similarity. Below is an example of a program entitled test.c which is comprised of code segments which contain both static and dynamic similarities:

```
1   #include <stdio.h>
2
3   #define MAX    3
4
5   typedef struct node node;
6
7   struct node {
8       int     value;
9       node    *next;
10  };
11
12  extern char *malloc( );
13
14  void
15  add(val,l)
16  int     val;
17  node    **l;
18  {
19      node *neo;
20
21      neo = (node *)malloc(sizeof(node));
22      neo->value = val;
23      neo->next = *l;
24      *l = neo;
25      return;
26  }
27
28  void
29  delete(l)
30  node    **l;
31  {
32      node    *nd;
33
34      if (!(*l))
35          return;
36      nd = *l;
37      *l = nd->next;
38      free(nd);
39      return;
40  }
41
42  void
43  copy(to, from)
44  node    *to;
45  node    *from;
46  {
47      to->value = from->value;
48      to->next = from->next;
49  }
50
51  int
52  nth(pos, l, storage)
53  int     pos;
54  node    *l;
55  int     *storage;
56  {
57      node    *ndptr;
58
59      for (ndptr = l; pos && ndptr; - - pos, ndptr = ndptr->next)
60
61      if(!ndptr)
62          return 0;
63      *storage = ndptr->value;
64      return 1;
65  }
66
67  void
68  main( )
69  {
70      int     buf[10]
71      int     j;
72      int     t;
73
74      node    *list;
75      node    list2;
76
77      list = (node *)0;
78      list2.value = 10;
79      list2.next = list;
80
81      for (j = 0; j < MAX; ++j)
82          add(MAX - j, &list);
83
84      copy(&list2, list->next->next);
85
86      for (j = 0; j < MAX; ++j) {
87          nth(j, list, &t);
88          printf("j:(%d)= %d ", j, t);
89      }
90
91      for (j = 0; j < MAX; ++j)
92          delete(&list);
93
94      for (j = 0; j < MAX; ++j)
95          buf[j] = j;
96      exit(0);
97  }
```

Similarity measurements are performed between two or more code segments to identify how closely related the two code segments are for some defined set of properties. The code segments may be identified as two functions within either the same program or different programs or any other defined designation such as, but not limited to blocks, Lvalues or statements. The similarity measurement is typically represented by a number which, for example, may be in the range between zero and one inclusively, where zero represents totally dissimilar code segments and one represents identical code segments. In accordance with the present invention, similarity measurements are defined for both data types and executable code. The similarity measurement between two code segments is the weighted average of the similarity measurement between the data types used in the code segments and the similarity measurement between the executable code contained in the code segments as will be described in detail hereinafter.

Figure 2:
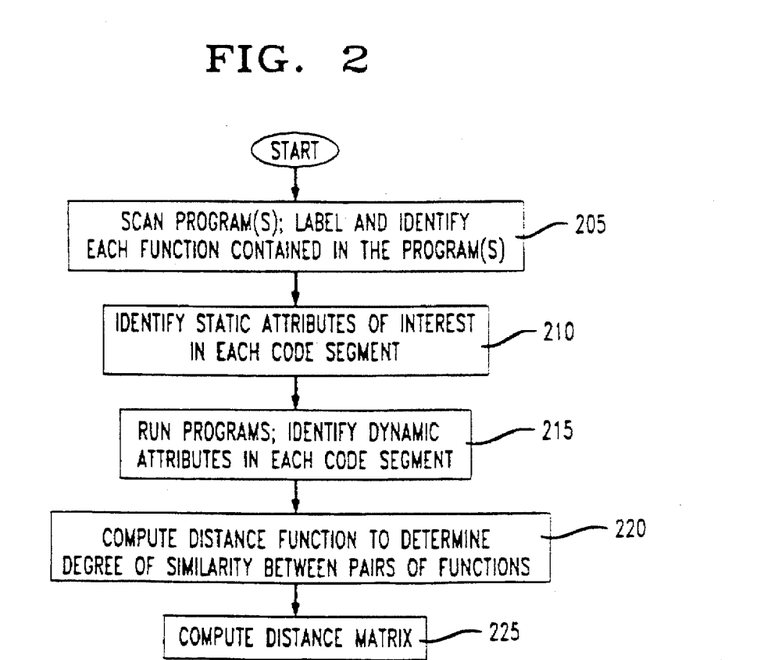
FIG. 2 is a flow chart illustrating a method for identifying similarities in code segments in accordance with the present invention.

FIG. 2 illustrates a flow diagram of the method used for identifying similarities between two or more code segments in accordance with the present invention. A program or programs which are to be analyzed are initially scanned and each code segment is identified and labelled (step 205). For example, the program test.c represented above comprises a plurality of functions for which each represents a code segment to be identified and analyzed. Information relating to each of these functions may be contained in a data structure such as f_static.info which is illustrated below:

TABLE 1

| | |
|---|---|
| add;test.c | Line 18 to 26 |
| nth;test.c | Line 56 to 65 |
| delete;test.c | Line 31 to 40 |
| main;test.c | Line 69 to 97 |
| copy;test.c | Line 46 to 49 |

Each row within the table contains information for a given function. This information includes the name of the function, the name of the program in which the function is contained and the line numbers at which the function exists within the program. For example, row 1 represents the information for the function entitled "add". The function "add" exists in the program test.c at lines 18–26.

Attributes of interest are specified which are then identified in each code segment (step 210). Illustratively, types of identifiers (I), such as, but not limited to arguments, globals, statics and autos, are identified in each function. An identifier indicates the place in a program in which a particular state is remembered. This information can be conveyed by a data structure entitled f_static.sym as illustrated below:

TABLE 2

```
    Number of functions clustered is 5
0   extern void add( );
    test.cLine  18 to  26
        arguments:
            int val;
            struct node **I;
        globals:    1
            extern char *malloc( );
        statics:    0
        autos:      1
            struct node *neo;
1   extern inth nth( );
    test.c Line   56 to 65
        arguments:
            int pos;
            struct node *I;
            int *storage;
        globals:    0
        statics:    0
        autos:      1
            struct node *ndptr;
2   extern void delete ( );
    test.c Line    31 to 40
        arguments:
            struct node **I;
        globals:    1
```

TABLE 2-continued

```
            extern int free( );
        statics:    0
        autos:      1
            struct node *nd.
    extern void main( );
    test.c Line   69 to 97
        arguments:
        globals:    6
            extern int exit ( );
            extern void delete ( );
                struct node **I;
            extern int printf ( );
            extern int nth ( );
                int pos;
                struct node *I;
                int *storage;
            extern void copy ( );
                struct node *to;
                struct node *from;
            extern void add ( );
                int val;
                struct node **I;
        statics:    0
        autos:      5
            int j;
            int buf[10];
            struct node *list;
            int t;
            struct node list2;
4   extern void copy ( );
    test.c Line   46 to 49
        arguments:
            struct node *to;
            struct node *from;
        globals:    0
        statics:    0
        autos:      0
```

As indicated above, the data structure f_static.sym indicates where each function occurs in the program test.c and then indicates the type of identifiers in the function and the number of occurrences of each identifier types in each function. For example, the function add contains arguments, int val and struct node **I, one global identifier, char *malloc( ), no static identifiers, and one auto identifier, struct node *neo.

This information may be illustrated as exemplified by data structure f_static.data along with the identifier information as illustrated below:

TABLE 3

| bb #0 | lv | c | s | i | l | f | d | v | uc | us | ui | ul | * | [] | e | s{ | u{(): | E |
|---|---|---|---|---|---|---|---|---|---|---|---|---|---|---|---|---|---|---|
| sig | 0 | 0 | 0 | 0 | 0 | 0 | 0 | 0 | 0 | 0 | 0 | 0 | 0 | 0 | 0 | 0 | 1 | 0 |
| glb | 0 | 0 | 0 | 0 | 0 | 0 | 0 | 0 | 0 | 0 | 0 | 0 | 0 | 0 | 0 | 0 | 1 | 0 |
| stc | 0 | 0 | 0 | 0 | 0 | 0 | 0 | 0 | 0 | 0 | 0 | 0 | 0 | 0 | 0 | 0 | 0 | 0 |
| aut | 0 | 0 | 0 | 0 | 0 | 0 | 0 | 0 | 0 | 0 | 0 | 1 | 0 | 0 | 0 | 0 | 0 | 0 |

| bb #1 | lv | c | s | i | l | f | d | v | uc | us | ui | ul | * | [] | e | s{ | u{(): | E |
|---|---|---|---|---|---|---|---|---|---|---|---|---|---|---|---|---|---|---|
| sig | 0 | 0 | 0 | 0 | 0 | 0 | 0 | 0 | 0 | 0 | 0 | 0 | 0 | 0 | 0 | 0 | 1 | 0 |
| glb | 0 | 0 | 0 | 0 | 0 | 0 | 0 | 0 | 0 | 0 | 0 | 0 | 0 | 0 | 0 | 0 | 0 | 0 |
| stc | 0 | 0 | 0 | 0 | 0 | 0 | 0 | 0 | 0 | 0 | 0 | 0 | 0 | 0 | 0 | 0 | 0 | 0 |
| aut | 0 | 0 | 0 | 0 | 0 | 0 | 0 | 0 | 0 | 0 | 0 | 1 | 0 | 0 | 0 | 0 | 0 | 0 |

| bb #2 | lv | c | s | i | l | f | d | v | uc | us | ui | ul | * | [] | e | s{ | u{(): | E |
|---|---|---|---|---|---|---|---|---|---|---|---|---|---|---|---|---|---|---|
| sig | 0 | 0 | 0 | 0 | 0 | 0 | 0 | 0 | 0 | 0 | 0 | 0 | 0 | 0 | 0 | 0 | 1 | 0 |
| glb | 0 | 0 | 0 | 0 | 0 | 0 | 0 | 0 | 0 | 0 | 0 | 0 | 0 | 0 | 0 | 0 | 1 | 0 |
| stc | 0 | 0 | 0 | 0 | 0 | 0 | 0 | 0 | 0 | 0 | 0 | 0 | 0 | 0 | 0 | 0 | 0 | 0 |

TABLE 3-continued

| | | | | | | | | | | | | | | | | | | |
|---|---|---|---|---|---|---|---|---|---|---|---|---|---|---|---|---|---|---|
| aut | 0 | 0 | 0 | 0 | 0 | 0 | 0 | 0 | 0 | 0 | 0 | 1 | 0 | 0 | 0 | 0 | 0 | 0 |

| bb #3 | lv | c | s | i | l | f | d | v | uc | us | ui | ul | * | [] | e | s{ | u{(): | E |
|---|---|---|---|---|---|---|---|---|---|---|---|---|---|---|---|---|---|---|
| sig | 0 | 0 | 0 | 0 | 0 | 0 | 0 | 0 | 0 | 0 | 0 | 0 | 0 | 0 | 0 | 0 | 1 | 0 |
| glb | 0 | 0 | 0 | 0 | 0 | 0 | 0 | 0 | 0 | 0 | 0 | 0 | 0 | 0 | 0 | 0 | 6 | 0 |
| stc | 0 | 0 | 0 | 0 | 0 | 0 | 0 | 0 | 0 | 0 | 0 | 0 | 0 | 0 | 0 | 0 | 0 | 0 |
| aut | 1 | 0 | 0 | 1 | 0 | 0 | 0 | 0 | 0 | 0 | 0 | 1 | 0 | 0 | 0 | 0 | 0 | 0 |
|  | 0 | 0 | 0 | 2 | 0 | 0 | 0 | 0 | 0 | 0 | 0 | 1 | 1 | 0 | 1 | 0 | 0 | 0 |

| bb #4 | lv | c | s | i | l | f | d | v | uc | us | ui | ul | * | [] | e | s{ | u{(): | E |
|---|---|---|---|---|---|---|---|---|---|---|---|---|---|---|---|---|---|---|
| sig | 0 | 0 | 0 | 0 | 0 | 0 | 0 | 0 | 0 | 0 | 0 | 0 | 0 | 0 | 0 | 0 | 1 | 0 |
| glb | 0 | 0 | 0 | 0 | 0 | 0 | 0 | 0 | 0 | 0 | 0 | 0 | 0 | 0 | 0 | 0 | 0 | 0 |
| stc | 0 | 0 | 0 | 0 | 0 | 0 | 0 | 0 | 0 | 0 | 0 | 0 | 0 | 0 | 0 | 0 | 0 | 0 |
| aut | 0 | 0 | 0 | 0 | 0 | 0 | 0 | 0 | 0 | 0 | 0 | 0 | 0 | 0 | 0 | 0 | 0 | 0 |

Each row in a grouping indicates the formal parameters which have been extracted from the program and the number of occurrences of a given parameter. In the above example, these parameters include signatures (sig), globals (glb), static identifiers (stc), auto identifiers (aut) and operators (sop).

Operator information may also be included with the identifier information. The operator information indicates the different types of operations performed within the program test.c.

There are 25 types of C operations which may be performed by the program test.c. The types of operators identified in program test.c were determined by observing how each of the operations is performed in hardware and then making a determination of which hardware operations are similar to one another. For example, in hardware the addition and subtraction operations are similar. However, the multiplication operation is significantly different. As such the multiplication operation would be grouped in a different operator type than the addition operation. These operation types are illustrated in the data structure f_static.operations as illustrated below:

TABLE 4

| | |
|---|---|
| sop_logical = 0, | /*&&, \|\| */ |
| sop_bit_log, | /* !, ~, &, ^, \|, &=, ^=, \|= */ |
| sop_bit_shift, | /* >>, <<, <<=, >>= */ |
| sop_address, | /* ., ->, *, [], & */ |
| sop_compare, | /* <, <=, >, >=, ==, != */ |
| sop_addr_arith, | /* ++, -- */ |
| sop_add_arith, | /* -, +, -=, += */ |
| sop_mult_arith, | /* *, /, %, *=, /=, %= */ |
| sop_assignment, | /* = */ |
| sop_control, | /* ?:, f( ), ", " */ |
| sop_type, | /* cast, sizeof */ |
| sop_constant, | |
| sop_extern, | |
| sop_local, | |
| sop_arg, | |

TABLE 4-continued sop_usechar,
sop_usedouble,
sop_usefloat,
sop_useint,
sop_uselong,
sop_useshort,
sop_usestruct,
sop_useunion,
sop_useenum,
sop_ignore, The number of occurrences of each operator in each function of the program test.c are illustrated as exemplified by the data structure shown below:

TABLE 5

| bb # | | | | | | | | | | | | | | | | | | | | | | | | | |
|---|---|---|---|---|---|---|---|---|---|---|---|---|---|---|---|---|---|---|---|---|---|---|---|---|---|
| 1 | 0 | 0 | 0 | 6 | 0 | 0 | 0 | 0 | 0 | 4 | 2 | 1 | 0 | 1 | 4 | 3 | 0 | 0 | 0 | 1 | 0 | 0 | 0 | 0 | 0 |
| 2 | 0 | 0 | 0 | 5 | 0 | 0 | 1 | 0 | 3 | 8 | 0 | 0 | 0 | 6 | 4 | 0 | 0 | 0 | 2 | 0 | 0 | 0 | 0 | 0 | 0 |
| 3 | 0 | 0 | 0 | 5 | 0 | 0 | 0 | 0 | 2 | 4 | 0 | 0 | 1 | 3 | 3 | 0 | 0 | 0 | 0 | 0 | 0 | 0 | 0 | 0 | 0 |
| 4 | 0 | 0 | 0 | 10 | 4 | 1 | 5 | 0 | 8 | 23 | 1 | 0 | 6 | 29 | 0 | 0 | 0 | 0 | 12 | 0 | 0 | 0 | 0 | 0 | 0 |
| 5 | 0 | 0 | 0 | 8 | 0 | 0 | 0 | 0 | 2 | 1 | 0 | 0 | 0 | 0 | 4 | 0 | 0 | 0 | 0 | 0 | 0 | 0 | 0 | 0 | 0 |

Each column of table five represents one of the operation types illustrated in Table 4. The groupings of information in both tables 3 and 5 correspond to a particular function which is labelled as bb#. Each column represents the type of identifier or operator (see Table 4) found in the program test.c. The number associated with each function row for each column represents the number of occurrences of that particular identifier or operator in that function. For example, an lv identifier occurs in the autos of function number 3. The above information indicates the types of attributes which may be found within a given block and the row, column combination indicates the number of occurrences of that particular attribute within the block. For example, there is one global identifier in block number zero. Each row of the data structure indicates a particular operation which is executed by the program test.c and the symbols which represent that particular operation.

Once all of the static attributes have been extracted from the program test,c, the program is run so that the dynamic attributes may be extracted (step 215). These dynamic attributes may include, but are not limited to, control flow and data flow analysis. The dynamic data which represents the control flow may be identified in a data structure entitled b_dynamic.ctrl as illustrated below:

TABLE 6

| Block # | 1 | 2 | 3 | 4 | 5 |
|---------|----|----|---|---|---|
| 1 | 14 | 0 | 0 | 1 | 0 |
| 2 | 0 | 11 | 0 | 0 | 0 |
| 3 | 1 | 0 | 0 | 0 | 0 |
| 4 | 0 | 1 | 0 | 0 | 1 |
| 5 | 0 | 0 | 0 | 1 | 2 |

This data structure identifies each block which is executed and determines the properties of the other block which will be executed. A block is a single entry such as a line instruction. Each row and column represents a particular block. The number identified in each space indicated the probability that a given block will transition to another given block. For example, the number 14 in the first space indicates that block number 1 will probably transition to itself fourteen times. The next space in the row (0) indicates that block number 1 will probably transition to block number 2 zero times. It is to be understood by those skilled in the art that the above data structure b_dynamic.ctrl is an exemplary history matrix which may be used to represent the data and that the data can be formatted in various ways without departing from the scope and spirit of the present invention.

A data structure entitled f_dynamic.ctrl may also be created to identify which function is executed and to determine the properties of other functions which may be executed as shown below:

TABLE 7

| Function # | 1 | 2 | 3 | 4 | 5 |
|------------|----|----|----|----|---|
| 1 | 12 | 0 | 0 | 3 | 0 |
| 2 | 0 | 12 | 0 | 3 | 0 |
| 3 | 0 | 0 | 12 | 3 | 0 |
| 4 | 3 | 3 | 3 | 13 | 1 |
| 5 | 0 | 0 | 0 | 1 | 2 |

The data structure identifies each function which is executed and determines the properties of the other function which will be executed in a similar manner to the data structure illustrated above for recording dynamic block information. Each row and column represents a particular function. A function corresponds to a particular collection of blocks. The number identified in each space indicated the probability that a given function will transition to another given function. For example, the number 12 in the first space indicates that function number 1 will probably transition to itself twelve times. The next space in the row (0) indicates that function number 1 will probably transition to function number 2 zero times.

A second data structure entitled dynamic.data may be created to identify each time one of the identifiers shown above in data structure f_static.sym is modified or referenced as shown below:

TABLE 8

| | ID # | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| | a b | a b | a b | a b | a b | a b | a b | a b | a b | a b | a b | a b | a b | a b | a b | a b | a b | a b | a b |
| 1a | 0 3 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| b | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 2 | 0 1 | 0 0 |
| 2a | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| b | 0 3 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 3a | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| b | 0 3 | 0 0 | 0 0 | 0 0 | 0 0 | 0 0 | 0 0 | 0 0 | 0 0 | 0 1 | 0 0 | 0 0 | 0 0 | 0 0 | 0 0 | 0 0 | 0 0 | 0 0 | 0 0 |
| 4a | 0 0 | 0 0 | 0 0 | 0 0 | 0 6 | 0 0 | 0 0 | 0 0 | 0 0 | 0 0 | 0 0 | 0 0 | 0 0 | 0 0 | 0 0 | 0 0 | 0 0 | 0 0 | 0 0 |
| b | 0 0 | 0 0 | 0 0 | 0 0 | 3 0 | 0 1 | 0 0 | 0 0 | 0 0 | 0 0 | 0 0 | 0 0 | 0 0 | 0 0 | 0 0 | 0 0 | 0 0 | 0 0 | 0 0 |
| 5a | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| b | 0 0 | 0 0 | 0 0 | 3 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 6a | 0 0 | 0 0 | 0 0 | 0 3 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| b | 0 0 | 0 0 | 0 0 | 0 6 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 7a | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| b | 0 0 | 0 0 | 0 0 | 0 3 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 8a | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| b | 0 0 | 0 0 | 0 0 | 0 0 | 0 0 | 0 0 | 0 0 | 0 0 | 0 3 | 0 1 | 0 0 | 0 0 | 0 0 | 0 0 | 0 0 | 0 0 | 0 0 | 0 0 | 0 0 |
| 9a | 0 0 | 0 0 | 0 0 | 0 0 | 0 0 | 0 0 | 0 0 | 0 3 | 0 0 | 0 0 | 0 0 | 0 0 | 0 0 | 0 0 | 0 0 | 0 0 | 0 0 | 0 0 | 0 0 |
| b | 0 0 | 0 0 | 0 0 | 0 0 | 0 0 | 0 0 | 0 0 | 0 0 | 0 0 | 0 0 | 0 0 | 3 0 | 0 0 | 0 0 | 0 0 | 0 0 | 0 1 | 0 1 | 0 1 |
| 10a | 0 0 | 0 0 | 0 0 | 0 0 | 0 0 | 0 0 | 0 0 | 0 0 | 0 3 | 0 0 | 1 0 | 1 0 | 0 0 | 0 0 | 0 0 | 0 0 | 0 0 | 0 0 | 0 0 |
| b | 3 0 | 0 0 | 0 1 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| 11a | 0 0 | 0 0 | 0 0 | 0 0 | 0 0 | 0 0 | 0 0 | 0 0 | 0 0 | 0 1 | 0 0 | 1 0 | 0 0 | 0 0 | 0 0 | 0 0 | 0 0 | 0 0 | 0 0 |
| b | 0 0 | 0 0 | 0 0 | 0 0 | 0 0 | 0 0 | 0 0 | 0 0 | 0 0 | 0 1 | 0 0 | 0 0 | 0 0 | 0 0 | 0 1 | 0 0 | 0 0 | 0 0 | 0 0 |
| 12a | 0 0 | 0 0 | 0 0 | 0 0 | 0 0 | 0 0 | 0 0 | 0 0 | 0 0 | 0 0 | 0 0 | 0 16 | 0 0 | 0 0 | 0 0 | 0 0 | 0 0 | 0 0 | 0 0 |
| b | 0 0 | 0 0 | 0 0 | 0 0 | 0 0 | 0 0 | 0 0 | 0 0 | 0 9 | 0 1 | 1 0 | 0 0 | 0 0 | 0 0 | 0 0 | 0 0 | 0 0 | 0 0 | 0 0 |
| 13a | 0 0 | 0 0 | 0 0 | 0 0 | 0 0 | 0 0 | 0 0 | 0 0 | 0 0 | 0 0 | 0 0 | 0 3 | 0 0 | 0 0 | 0 0 | 0 0 | 0 0 | 0 0 | 0 0 |
| b | 0 0 | 0 0 | 0 3 | 0 0 | 0 0 | 0 0 | 0 0 | 0 0 | 0 0 | 0 0 | 0 0 | 1 0 | 0 0 | 0 0 | 0 0 | 0 0 | 0 0 | 0 0 | 0 0 |
| 14a | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| b | 0 0 | 0 0 | 0 0 | 0 0 | 0 0 | 0 0 | 0 0 | 0 0 | 0 0 | 0 0 | 0 0 | 0 3 | 0 0 | 0 0 | 0 0 | 0 0 | 0 0 | 0 0 | 0 0 |
| 15a | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| b | 0 0 | 0 0 | 0 0 | 0 0 | 0 0 | 0 0 | 0 0 | 0 0 | 0 0 | 0 0 | 0 0 | 0 2 | 0 0 | 0 0 | 0 0 | 0 0 | 0 0 | 0 0 | 0 0 |
| 16a | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| b | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 2 | 0 0 | 0 0 | 0 0 |
| 17a | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |
| b | 0 0 | 0 1 | 0 1 | 0 0 | 0 0 | 0 0 | 0 0 | 0 0 | 0 0 | 1 0 | 0 0 | 1 0 | 1 0 | 0 0 | 0 1 | 0 0 | 0 0 | 0 0 | 0 0 |
| 18a | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 |

TABLE 8-continued

| | ID # | | | | | | | | | | | | | | | | | | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 |
| | a b | a b | a b | a b | a b | a b | a b | a b | a b | a b | a b | a b | a b | a b | a b | a b | a b | a b | a b |
| b | 0 0 | 0 1 | 0 1 | 1 0 | 0 0 | 0 0 | 0 0 | 0 0 | 0 0 | 1 0 | 0 0 | 0 0 | 1 0 | 0 0 | 0 1 | 0 0 | 0 0 | 0 0 | 0 0 |
| 19a | 0 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | 0 0 | |
| b | 0 0 | 0 1 | 0 1 | 1 0 | 0 0 | 0 0 | 0 0 | 0 0 | 0 0 | 0 0 | 0 0 | 0 0 | 0 0 | 0 0 | 0 0 | 0 0 | 0 0 | 0 0 | |

Each row and column can be thought of as being divided into pairs in which each pair represents a particular identifier. In the program test.c there are 19 identifiers. In general, two entries are made for each identifier. The first entry (i.e., #a) indicates when an identifier has been created. The second entry (i.e., #b) indicates when an identifier has been referenced. Each time an identifier has been referenced, indication is also made of what immediately follows the identifier. For example, if identifier 1 is modified and then identifier 3 is referenced, the entry to show this history would be a count of 1 in the row pair for variable 1, subrow modified and column pair for variable 3 subrow referenced. The dynamic data provides an indication of the adequacy of the identifier. By adequacy, it is meant that both the use and the order of the data is evaluated. The use of the data is determined by observing whether a given variable has been referenced and used when the program is run. A variable is in the proper order when the variable is created prior to it being referenced by the program.

Once all of the statistical and dynamic information has been gathered for the program test.c, a similarity measurement can be calculated to determine the degree of similarity between each of the functions contained within the program. In determining the degree of similarity between each of the functions a distance function is calculated. In accordance with the present invention, two different distance functions are used. The first distance function $V_D$ is a modified Jaccord and used to measure variable and function distance as shown below:

$$V_D = \underset{M \in \text{matchings}}{\max} \left[ \frac{\sum_{a \in \text{dom}(M)} J(a, M(a))}{\#(A \cup B)} \right] \quad (1)$$

where

J(a,b)=the similarity measure between properties a and b

A,B=the true set of properties for the first object and the second object

M=an injection from a subset A to B

The distance function produces a distance measurement which indicates the degree of similarity between the identifiers and function types contained within the two code segments being compared. A distance function is computed for each possible pair of functions (step 220). The distance measurement between two code segments takes into consideration not only the segments' signatures but also the global, static, and automatic variables used. For example, for the program test.c each of the functions may be compared to determine a distance measurement for each pairing of functions. In other words, a distance measurement can be computed for each individual component of program test.c, i.e., signature (sig), global (glb), static (stat) and automatic (auto) variables. Since there are five functions the comparisons would be as follows where column one would represent the function data inserted into variable A of equation 1 and column two would represent the function data inserted into variable B of equation 1. The table below represents the distance measurements for each of the variable types mentioned above:

TABLE 9

| A | B | SIG | GLB | STAT | AUTO |
|---|---|---|---|---|---|
| 0 | 0 | 1.0000 | 1.0000 | 1.0000 | 1.0000 |
| 0 | 1 | 0.3750 | 0.0000 | 1.0000 | 1.0000 |
| 0 | 2 | 0.6667 | 0.1250 | 1.0000 | 1.0000 |
| 0 | 3 | 0.3333 | 0.0208 | 1.0000 | 0.2000 |
| 0 | 4 | 0.3750 | 0.0000 | 1.0000 | 0.0000 |
| 1 | 0 | 0.3750 | 0.0000 | 1.0000 | 1.0000 |
| 1 | 1 | 1.0000 | 1.0000 | 1.0000 | 1.0000 |
| 1 | 2 | 0.1250 | 0.0000 | 1.0000 | 1.0000 |
| 1 | 3 | 0.0000 | 0.0000 | 1.0000 | 0.2000 |
| 1 | 4 | 0.2000 | 1.0000 | 1.0000 | 0.0000 |
| 2 | 0 | 0.6667 | 0.1250 | 1.0000 | 1.0000 |
| 2 | 1 | 0.1250 | 0.0000 | 1.0000 | 1.0000 |
| 2 | 2 | 1.0000 | 1.0000 | 1.0000 | 1.0000 |
| 2 | 3 | 0.5000 | 0.1667 | 1.0000 | 0.2000 |
| 2 | 4 | 0.5000 | 0.0000 | 1.0000 | 0.0000 |
| 3 | 0 | 0.3333 | 0.0208 | 1.0000 | 0.2000 |
| 3 | 1 | 0.0000 | 0.0000 | 1.0000 | 0.2000 |
| 3 | 2 | 0.5000 | 0.1667 | 1.0000 | 0.2000 |
| 3 | 3 | 1.0000 | 1.0000 | 1.0000 | 1.0000 |
| 3 | 4 | 0.3333 | 0.0000 | 1.0000 | 0.0000 |
| 4 | 0 | 0.3750 | 0.0000 | 1.0000 | 0.0000 |
| 4 | 1 | 0.2000 | 1.0000 | 1.0000 | 0.0000 |
| 4 | 2 | 0.5000 | 0.0000 | 1.0000 | 0.0000 |
| 4 | 3 | 0.3333 | 0.0000 | 1.0000 | 0.0000 |
| 4 | 4 | 1.0000 | 1.0000 | 1.0000 | 1.0000 |

In order to obtain a composite distance measurement for each function of program test.c, each of the distance measurements computed above must be added together. In accordance with the present invention, a weight may be associated with each variable type so that one variable type may be emphasized more than another variable type. For example, if a certain routine uses one variable type more frequently than the other variable types, the higher frequency variable type may be accorded a higher weight than the other variable types. Likewise, if a particular variable type is used infrequently, it may be assigned a lower weight. In the present example, a weight of 0.5000 has been assigned to each variable type so that the variable types are equally weighted to indicate that there is a 50% chance of each variable type occurring. A composite distance function is determined for each pair and may be compiled into a distance matrix (step 225) as illustrated below

TABLE 10

| | 0 | 1 | 2 | 3 | 4 |
|---|---|---|---|---|---|
| 0 | 1.0000 | 0.4811 | 0.6458 | 0.1690 | 0.3650 |
| 1 | 0.4811 | 1.0000 | 0.4083 | 0.1547 | 0.2708 |
| 2 | 0.6458 | 0.4083 | 1.0000 | 0.1889 | 0.40000 |

TABLE 10-continued

|   | 0 | 1 | 2 | 3 | 4 |
|---|---|---|---|---|---|
| 3 | 0.1690 | 0.1547 | 0.1889 | 1.0000 | 0.0891 |
| 4 | 0.3650 | 0.2708 | 0.4000 | 0.0891 | 1.0000 |

Figure 3:
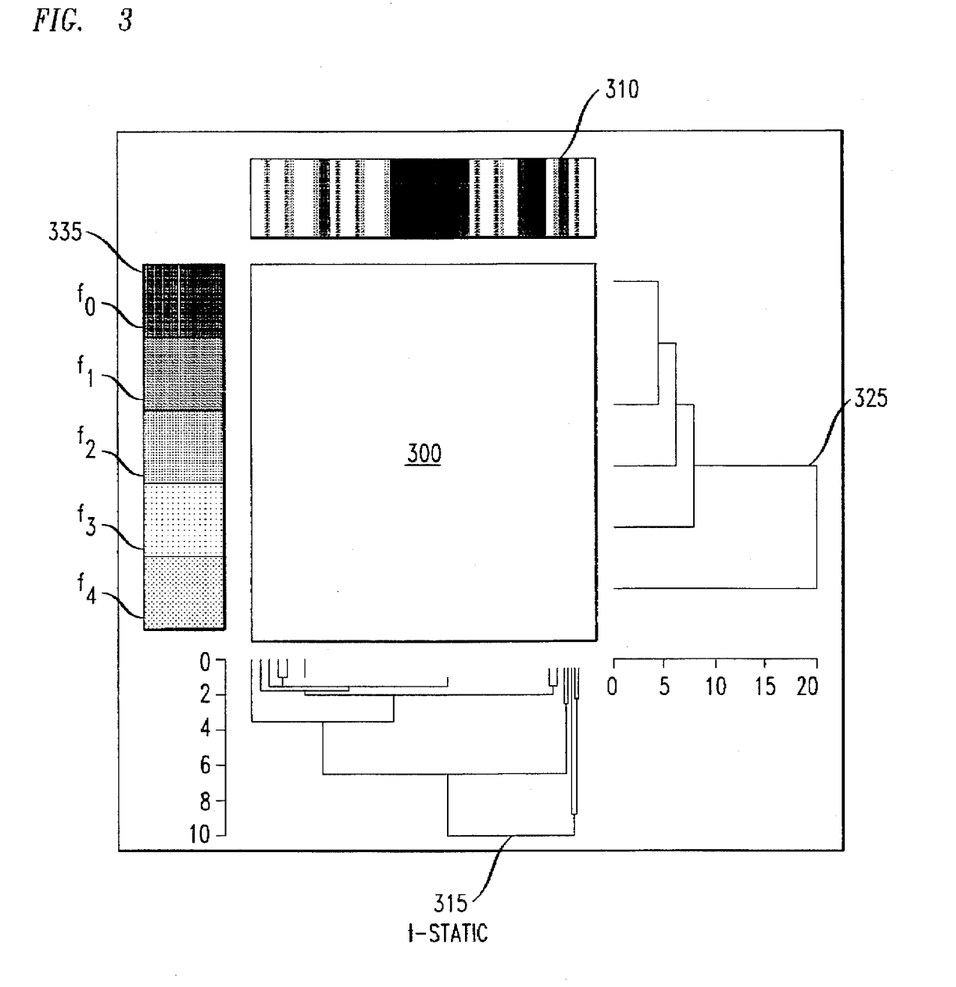
FIG. 3 is a diagram of a cluster interface which represents the distance values generated in accordance with the present invention.

The rows and columns of the above matrix indicate the particular function being compared. The distance values derived from equation (1) can be represented in a number of ways. One way to represent the distance values is by generating a cluster interface as illustrated in FIG. 3. A method for generating a cluster interface is described in copending patent application Ser. No. 08/373,340, entitled "Method of Generating a Browser Interface for Representing Similarities between Segments of Code" which has been filed concurrently herewith.

FIG. 3 shows a display 300 which illustrates a cluster interface generated for functions $f_0$, $f_1$, $f_2$, $f_3$ and $f_4$. The cluster interface maps the similarities between each of the functions based on certain predefined constraints. The constraints are generally defined in terms of a weighting scheme which may be selected by the user to generate the cluster interface. The bars 310 illustrated at the top of the display are used to represent the weights which may be applied to the attributes to determine specific distance relationships. The weights may place additional emphasis on certain structural features, such as, for example, specific variables or operators. The weights may also be used to emphasize certain functions such as particular subroutines or particular commands. Each of the bars 310 represents a variable type contained in at least one of the functions. A full bar is equal to the greatest weight (e.g., 1) and smaller bars represent fractional amounts. A cluster interface 315 illustrating the affect of the particular weighting scheme selected is located at the bottom of the display 300. If the weights defined by the bars 310 are altered, the cluster interface 315 will change accordingly.

To the right of display 300 is a cluster interface 325 which represents the similarity of the code segments being compared. To the left of display 300 are bars 335 which are representative of each of the functions being compared. Each function is represented by a different bar. Each bar 335 can be weighted to indicate the importance of the particular function. A full bar represents a weight of one. Display 300 generates an intensity matrix which indicates the similarity of the code segments when the weighting scheme is applied. Each attribute under consideration is represented in display 300 by a block 330. Blocks 330 corresponding to a particular weighted attribute and code segment are generated which represent the corresponding distance measurement and indicate the degree of similarity relative to the other code segments to which the same weight has been applied. The intensity of block 330 represents the data values. Illustratively, the darker the block 330, the larger the data value.

A separate distance function $O_D$ is used to compute similarity measurements between pairs of operators from different functions as illustrated below:

$$O_D = \frac{\sum_{i=1}^{27} \frac{\min(n_i(X)/n_i(Y))}{\max(n_i(X)/n_i(Y))}}{\sum_{i=1}^{27} [n_i(X) > 0] + \sum_{i=1}^{27} [n_i(Y) > 0]} \quad (2)$$

where

X is the first function;

Y is the second function;

$n_i(X)$ is the times category i occurs in partition X; and

[S] is zero if S is false; one if S is true.

Distance functions are determined for each pair of operators and compiled into an operator distance matrix as illustrated below:

TABLE 11

|   | 0 | 1 | 2 | 3 | 4 |
|---|---|---|---|---|---|
| 0 | 1.0000 | 0.5455 | 0.6667 | 0.1863 | 0.4800 |
| 1 | 0.5455 | 1.0000 | 0.5667 | 0.2427 | 0.3750 |
| 2 | 0.6667 | 0.5667 | 1.0000 | 0.1471 | 0.5000 |
| 3 | 0.1863 | 0.2427 | 0.1471 | 1.0000 | 0.1068 |
| 4 | 0.4800 | 0.3750 | 0.5000 | 0.1068 | 1.0000 |

As indicated above, the distance functions are used to contruct a suitable interface, such as, but not limited to, a cluster interface which illustrates the degree of similarity between the various functions.

The above method can be used in a number of applications for analyzing, designing, implementing and organizing code segments. Typically, these applications arise from the basic problem that large programs tend to be written by more than one person and many times code segments are copied and modified to perform different, but similar routines. As such, one possible application for the above method is to create a code segment which is for all intent purposes an outline of a routine desired and which includes the key code fragments. The above method can search and identify all code segments which are similar and which contain the outlined code fragments. Such an application is similar to a program which is capable of searching for key words or phrases. The programmer can then determine if the identified code segments perform the desired function. Such a technique can save the programmer time by reducing the need for the programmer to reproduce frequently used routines.

Another application for the above method, is to identify similar code segments and to assign each set of similar code segments to a general purpose library. In this way, the code segments can be easily located and retrieved. Such an approach may be used to reorganize code segments so that code segments that are related are assigned to the same storage module. Such an exercise is important if more than one user is accessing the code segments. Since only one user is able to access a storage module at any one time, strategic organization of the code segments may prevent users from attempting to access the same storage module at the same.

Similarly, if a program existing in a single processor is to be partitioned for an embedded system, it is important to know which code segments are similar in a dynamic sense. Those which are identified to be dynamically similar can be placed in the same storage module. The ability to identify similar code segments may also be useful for maintenance purposes. As discussed above, many times a routine may be copied and modified to perform a particular function. If a bug is later found in one of the code segments, the same bug may not be located and fixed in the modified code segments. The above method can be used to find all the modified code segments and thus ensure that changes made to the program are consistent.

Other applications include the ability to simplify and slice code. If a big library exists, the code tends to be slow. The above method can identify which pieces of the code are general purpose and partition that pieces of the code to make the program run faster. The method can also be used to develop a technique for executing, analyzing and comparing basic blocks and functions of C and C++ code. The method can also be used to test a program.

It will be appreciated that those skilled in the art will be able to devise numerous and various alternative arrangements which, although not especially shown or described herein, embody the principles of the invention and are within its scope and spirit.

We claim:

1. A method of analyzing a plurality of code segments, each code segment comprised of one or more lines of program instructions, the method comprising:

extracting from each code segment one or more predetermined static attributes;

running each said code segment;

extracting from each said code segment dynamic attributes;

computing a distance function based on said extracted static and dynamic attributes for a given pair of code segments, said distance function producing a number of distance measurements; and displaying said distance measurements.

2. A method of analyzing at least one attribute in at least two code segments, each code segment comprised of one or more lines of program instructions, the method comprising:

identifying one or method dynamic attributes;

running each code segment and extracting the identified dynamic attributes from said code segment; and computing a distance function based on the extracted dynamic attributes from each code segment, said distance function producing a measurement indicative of the degree of similarity between the code segments.

3. The method according to claim 2 wherein a weighing function is applied to one or more of the identified dynamic attributes.

4. The method according to claim 2 wherein said measurement falls within a range from 0 to 1 inclusive.

5. The method according to claim 4 wherein a measurement equal to 1 indicates that the code segments are identical.

6. The method according to claim 4 wherein a measurement equal to zero indicates that there are no similarities between said code segments.

7. The method according to claim 2 further comprising the steps of:

identifying one or more semantic attributes for which a measurement of similarity is to be made;

extracting said identified semantic attributes from each code segment; and computing a distance function based on the extracted semantic attributes from each code segment, said distance function producing a measurement indicative of the degree of similarity between the code segments.

8. The method according to claim 7 wherein said semantic attributes include operators.

9. The method according to claim 7 wherein said measurement falls within a range from 0 to 1 inclusive.

10. The method according to claim 9 wherein a measurement equal to 1 indicates that the code segments are identical.

11. The method according to claim 9 wherein a measurement equal to 0 indicates that there are no similarities between the code segments.

12. The method according to claim 7 wherein a weighing function is applied to one or more of the semantic attributes.

13. A method of analyzing at least one attribute in at least two code segments, each code segment comprised of one or more lines of program instructions, the method comprising:

identifying one or more semantic attributes;

extracting said identified semantic attributes from each code segment; and computing a distance function based on the extracted semantic attributes from each code segment said distance function producing a measurement indicative of the degree of similarity between the code segments.

14. The method according to claim 13 wherein said semantic attributes include operators.

15. The method according to claim 13 wherein said measurement falls within a range from 0 to 1 inclusive.

16. The method according to claim 15 wherein a measurement equal to 1 indicates that the code segments are identical.

17. The method according to claim 15 wherein a measurement equal to 0 indicates that there are no similarities between the code segments.

18. The method according to claim 13 wherein a weighing function is applied to one or more of the semantic attributes.

19. The method according to claim 13 further comprising the steps of:

identifying one or more dynamic attributes;

running each code segment and extracting the identified dynamic attributes from said code segment; and computing a distance function based on the extracted dynamic attributes from each code segment, said distance function producing a measurement indicative of the degree of similarity between the code segments.

20. The method according to claim 19 wherein a weighing function is applied to one or more of the identified dynamic attributes.

21. The method according to claim 19 wherein said measurement fails within a range from 0 to 1 inclusive.

22. The method according to claim 21 wherein a measurement equal to 1 indicates that the code segments are identical.

23. The method according to claim 21 wherein a measurement equal to zero indicates that there are no similarities between said code segments.

24. A method of analyzing at least one attribute in at least cut two code segments, each code segment comprised of one or more lines of program instructions, the method comprising:

identifying one or more semantic attributes;

extracting said identified semantic attributes from each code segment;

identifying one or more dynamic attributes;

running each code segment and extracting the identified dynamic attributes from said code segment; and computing a distance function based on the extracted semantic and dynamic attributes from each code segment, said distance function producing a measurement indicative of the degree of similarity between the code segments.

25. The method according to claim 24 wherein a weighing function is applied to one or more of the identified dynamic attributes.

26. The method according to claim 24 wherein a weighing function is applied to one or more of the semantic attributes.

27. The method according to claim 24 wherein said measurement falls within a range from 0 to inclusive.

28. The method according in claim 27 wherein a measurement equal to 1 indicates that the code segments are identical.

29. The method according to claim 27 wherein a measurement equal to zero indicates that there are no similarities between said code segments.

30. The method according to claim 24 wherein said semantic attributes include operators.

31. The method according to claim 24 wherein said semantic attribute is comprised of one or more code fragments which are programmed to perform a particular function, the method further comprising the steps of:

identifying which code segments contain the one or more code fragments; and determining whether the code fragments within the identified code segments perform the particular function.

32. The method according to claim 24 further comprising the steps of:

categorizing the code segments that are similar based on the identified attributes contained within the code segments;

allocating resources for creating a general purpose library; and storing said categorized code segments in said general purpose library.

33. The method according to claim 24 further comprising the steps of:

identifying one or more groups of code segments which contain similar dynamic attributes creating one or more storage modules; and storing each group of code segments in a different storage module.

34. The method according to claim 24 wherein said code segments are comprised of one or more lines of instructions programmed in C code.

35. The method according to claim 24 wherein said code segments are comprised of one or more lines of instructions programmed in C++ code.

* * * * *